(12) United States Patent
Ichikawa et al.

(10) Patent No.: US 9,443,655 B2
(45) Date of Patent: Sep. 13, 2016

(54) DIELECTRIC RESIN COMPOSITION FOR FILM CAPACITOR AND FILM CAPACITOR

(75) Inventors: Tomomichi Ichikawa, Nagaokakyo (JP); Yasunori Hioki, Nagaokakyo (JP); Norihiro Yoshikawa, Nagaokakyo (JP); Ichiro Nakamura, Nagaokakyo (JP); Shinichi Kobayashi, Nagaokakyo (JP); Ichiro Nakaso, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 0 days.

(21) Appl. No.: 13/235,815

(22) Filed: Sep. 19, 2011

(65) Prior Publication Data

US 2012/0008250 A1    Jan. 12, 2012

Related U.S. Application Data

(63) Continuation of application No. PCT/JP2010/056001, filed on Apr. 1, 2010.

(30) Foreign Application Priority Data

Apr. 3, 2009    (JP) .................. 2009-091052

(51) Int. Cl.
| | |
|---|---|
| C08G 18/84 | (2006.01) |
| C08G 63/91 | (2006.01) |
| H01G 4/005 | (2006.01) |
| H01G 4/18 | (2006.01) |
| C08J 5/18 | (2006.01) |
| C08K 5/29 | (2006.01) |
| H01G 4/20 | (2006.01) |
| H01G 4/30 | (2006.01) |

(52) U.S. Cl.
CPC . *H01G 4/18* (2013.01); *C08J 5/18* (2013.01); *C08K 5/29* (2013.01); *H01G 4/206* (2013.01); *H01G 4/30* (2013.01); *C08J 2329/14* (2013.01)

(58) Field of Classification Search
CPC ............ C08J 5/18; C08K 5/29; C08L 29/14; H01G 4/18; H01G 4/30; H01G 4/206
USPC ....................... 524/503; 525/58, 61
See application file for complete search history.

(56) References Cited

U.S. PATENT DOCUMENTS

| | | | | |
|---|---|---|---|---|
| 4,216,106 | A  * | 8/1980 | Miller ........................... | 252/570 |
| 6,403,263 | B1 * | 6/2002 | Roach .......................... | 429/233 |
| 7,635,519 | B2 | 12/2009 | Onoue et al. | |
| 2003/0130435 | A1* | 7/2003 | Tanaka et al. ............. | 525/330.3 |
| 2007/0083017 | A1* | 4/2007 | Dueber et al. ................ | 525/423 |

FOREIGN PATENT DOCUMENTS

| | | |
|---|---|---|
| JP | 10-119127 A | 5/1998 |
| JP | 2008-229849 A | 10/2008 |
| WO | WO-2006-100833 A1 | 9/2006 |

OTHER PUBLICATIONS

International Search Report, mailed Jun. 15, 2010.

* cited by examiner

*Primary Examiner* — Alexa Neckel
*Assistant Examiner* — Marie Reddick
(74) *Attorney, Agent, or Firm* — Arent Fox LLP

(57) ABSTRACT

To increase the heat resistance of a film capacitor, a dielectric resin composition is used as a material for a dielectric resin film used in a film capacitor, the dielectric resin composition being cured by mixing and crosslinking two or more organic materials having functional groups that react with each other to provide a cured article. At least one pair highly cohesive atomic groups which has a molecular cohesive energy equal to or higher than that of a methyl group and capable of cohering with each other due to the molecular cohesive energy is linked to the organic material. The highly cohesive atomic groups form a cohesive portion serving as pseudo-crosslinking.

19 Claims, 2 Drawing Sheets

DIELECTRIC RESIN COMPOSITION FOR FILM CAPACITOR AND FILM CAPACITOR

This is a continuation of application Serial No. PCT/JP2010/056001, filed Apr. 1, 2010, the entire contents of which is incorporated herein by reference.

TECHNICAL FIELD

The present invention relates to a dielectric resin composition for a film capacitor and a film capacitor including the dielectric resin composition. In particular, the present invention relates to improvement in heat resistance of a film capacitor.

BACKGROUND ART

A film capacitor, which is a type of capacitor, includes flexible resin films serving as a dielectric and metal films serving as first and second counter electrodes, the resin films being interposed between the metal films that facing each other, and the metal films being arranged on both main surfaces of the resin films. The film capacitor usually has a cylindrical shape obtained by winding the dielectric resin films. First and second external terminal electrodes are formed on opposing first and second end faces of the cylinder. The first counter electrode is electrically connected to the first external terminal electrode. The second counter electrode is electrically connected to the second external terminal electrode.

As the dielectric resin film for a film capacitor, for example, Japanese Unexamined Patent Application Publication No. 10-119127 (PTL 1) describes a biaxially oriented polypropylene film in which the molecular structure (atacticity) and the amount of an antioxidant added are optimized, and also describes a film capacitor including the biaxially oriented polypropylene film as a dielectric resin film, the film capacitor having excellent heat resistance and breakdown voltage. Usually, the upper limit of the operating temperature of polypropylene used as a material for a dielectric resin film of a film capacitor is 85° C. However, the film described in PTL 1 has an improved breakdown voltage, i.e., 540 V/μm at 105° C., and thus can be used at a higher temperature.

However, the guaranteed temperature is improved as described above in the film of PTL 1 but is only up to 105° C. The heat resistance is therefore not sufficient. That is, the film is not suitable for high temperature applications, for example, use in engine compartments of automobiles.

In the case of producing a film from a thermoplastic resin, such as polypropylene, usually, a pellet material is melted, extruded, and drawn. However, it is very difficult to produce a film having a thickness of less than 2.5 μm. Thus, it is not easy to reduce the thickness of a dielectric resin film to miniaturize the film capacitor.

For example, International Publication No. WO2006/100833 (PTL 2) discloses the use of polyisocyanate-crosslinked polyvinyl acetal as a material for a dielectric resin film in place of polypropylene, and that a dielectric filler is added in order to improve a dielectric constant. The polyvinyl acetal can be dissolved in a solvent. Accordingly, unlike polypropylene, a thin-layer sheet can be formed without using thermal melting or drawing.

However, when an electric field is applied to the dielectric resin film, the electric field is applied only to a resin portion of the film because the dielectric resin film disclosed in PTL 2 contains the filler having a high dielectric constant. As a result, the resin portion is likely to be damaged, thereby reducing the breakdown voltage. That is, a direct electric field is applied to the resin portion having a high volume resistivity in the dielectric resin film. In the case of an AC electric field, the AC electric field is mainly applied to the resin portion having a low dielectric constant.

CITATION LIST

Patent Literature

PTL 1: Japanese Unexamined Patent Application Publication No. 10-119127
PTL 2: International Publication No. WO2006/100833

SUMMARY OF INVENTION

Technical Problem

It is an object of the present invention to provide a dielectric resin composition for a film capacitor, the dielectric resin composition being capable of solving the foregoing problems.

It is another object of the present invention to provide a film capacitor including the foregoing dielectric resin composition for a film capacitor.

Solution to Problem

The present invention is directed to a dielectric resin composition for a film capacitor. To overcome the foregoing technical problems, the dielectric resin composition for a film capacitor has a structure described below.

That is, the dielectric resin composition for a film capacitor is cured by mixing and crosslinking two or more organic materials containing at least first and second organic materials having functional groups that react with each other, thereby providing a cured article, and at least one pair of highly cohesive atomic groups which have a molecular cohesive energy equal to or higher than that of a methyl group and which are capable of cohering with each other due to the molecular cohesive energy. Each member of the pair is located at an end of the main chain and/or side chain of at least one of the first and second organic materials.

In the dielectric resin composition for a film capacitor according to the present invention, preferably, the first organic material is a polyvinyl acetal, the highly cohesive atomic group is located at an end of the side chain of an acetal group in the polyvinyl acetal, and the proportion of the highly cohesive atomic group in the acetal group is in the range of 5 mole percent to 95 mole percent.

In the dielectric resin composition for a film capacitor according to the present invention, preferably, the first organic material is a polyvinyl acetal, and the cured article has a polyvinyl acetal content of 10% by weight to 90% by weight.

In the dielectric resin composition for a film capacitor according to the present invention, preferably, the polyvinyl acetal first organic material has a hydroxy group content of 10% to 38% by weight.

The present invention is also directed to a film capacitor including the foregoing dielectric resin composition for a film capacitor. A film capacitor according to the present invention includes a dielectric resin film obtained by curing the foregoing dielectric resin composition for a film capacitor and first and second counter electrodes facing each other with the dielectric resin film provided therebetween.

Advantageous Effects of Invention

In the dielectric resin composition for a film capacitor according to the present invention, a cohesive force attributed to the cohesive energy of the highly cohesive atomic groups is provided in addition to the effect of improving the heat resistance due to crosslinking, thereby improving the heat resistance of the dielectric resin film serving as a cured article. It is speculated that this effect is attributed to a pseudo-crosslinked state due to an interaction between atomic groups having high cohesive energy.

The use of the dielectric resin composition for a film capacitor according to the present invention enables us to provide a cured article having a glass transition temperature of 130° C. or higher. Accordingly, the dielectric resin film has high heat resistance. It is thus possible to increase the guaranteed temperature of a film capacitor including the dielectric resin film.

Furthermore, when counter electrodes are formed by evaporation in order to produce a film capacitor including the dielectric resin film, the evaporation step may be performed without cooling the dielectric resin film because the dielectric resin film has high heat resistance as described above.

In the dielectric resin composition for a film capacitor according to the present invention, the cured article has a breakdown voltage of 350 V/μm or more. Hence, the dielectric resin film including the dielectric resin composition has a high breakdown voltage. It is thus possible to reduce the thickness of the dielectric resin film while a predetermined breakdown voltage is maintained, thereby leading to a reduction in the size of the film capacitor.

DESCRIPTION OF EMBODIMENTS

A film capacitor including a dielectric resin composition according to the present invention will be described below with reference to FIG. 1.

Figure 1:
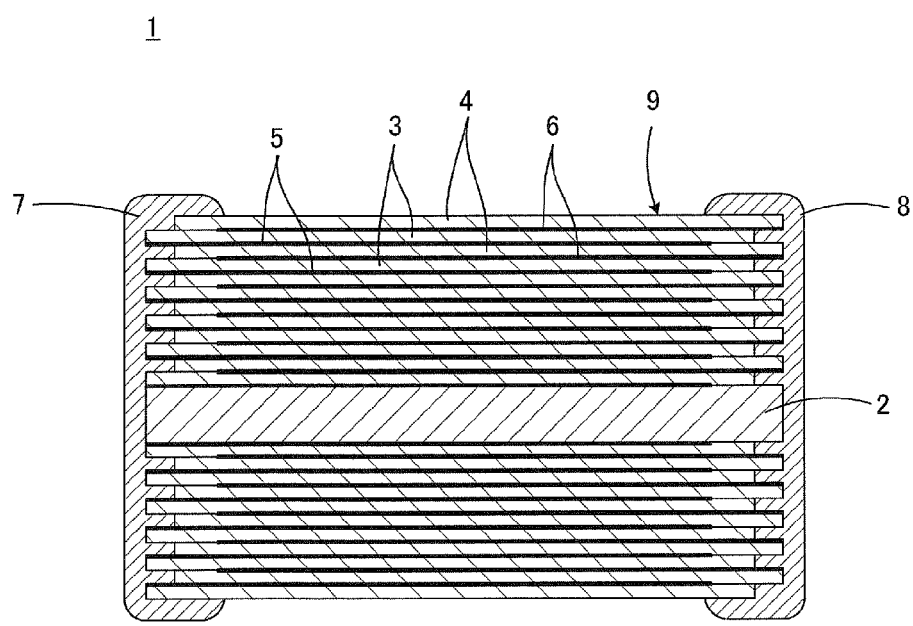
FIG. 1 is a longitudinal sectional view of an exemplary film capacitor including a dielectric resin composition according to the present invention.

Briefly, the wound film capacitor 1 illustrated in FIG. 1 includes first and second dielectric resin films 3 and 4 wound around a wound core 2; first and second counter electrodes 5 and 6 facing each other with the first or second dielectric resin film 3 or 4 provided therebetween; and first and second external terminal electrodes 7 and 8 electrically connected to the first and second counter electrodes 5 and 6, respectively.

More specifically, the first counter electrode 5 is arranged on the first dielectric resin film 3. The second counter electrode 6 is arranged on the second dielectric resin film 4. The first counter electrode 5 is arranged so as to reach one side end of the first dielectric resin film 3 and not to reach the other side end. The second counter electrode 6 is arranged so as not to reach one side end of the second dielectric resin film 4 and so as to reach the other end.

The first and second dielectric resin films 3 and 4 are wound around the wound core 2 so as to be stacked. As illustrated in FIG. 1, the first dielectric resin film 3 and the second dielectric resin film 4 are mutually displaced in the width direction in such a manner that an end portion of the first counter electrode 5 which reaches the one side end of the first dielectric resin film 3 which is exposed and in such a manner that an end portion of the second counter electrode 6 which reaches the one side end of the second dielectric resin film 4 which is exposed. As described above, the first and second dielectric resin films 3 and 4 are wound around the wound core 3, thereby providing a substantially cylindrical capacitor main body 9.

In the film capacitor 1 illustrated in FIG. 1, the second dielectric resin film 4 is located outside the first dielectric resin film 3, and the first and second counter electrodes 5 and 6 are located inside the first and second dielectric resin films 3 and 4, respectively.

The first and second external terminal electrodes 7 and 8 are formed by, for example, thermal spraying of zinc on end faces of the substantially cylindrical capacitor main body 9 described above. The first external terminal electrode 7 is in contact with the exposed end portion of the first counter electrode 5 to be electrically connected to the first counter electrode 5. The second external terminal electrode 8 is in contact with the exposed end portion of the second counter electrode 6 to be electrically connected to the second counter electrode 6.

The dielectric resin films 3 and 4 included in the film capacitor 1 are formed of films obtained by curing a dielectric resin composition according to the present invention.

The dielectric resin composition for a film capacitor is cured by mixing and crosslinking two or more organic materials containing at least first and second organic materials having functional groups that react with each other, thereby providing a cured article, which has a pair of highly cohesive atomic groups which have a molecular cohesive energy equal to or higher than that of a methyl group and which are cohering with each other due to the molecular cohesive energy. Each member of the cohesive pair is located at an end of the main chain and/or side chain of at least one of the first and second organic materials. Both materials may be disposed on the same organic material. Such cohesion is formed by an interacting structure, such as a stacking structure of benzene rings having π-electrons.

The molecular cohesive energy of a methyl group is described in Table 1. Table 1 exemplifies some atomic groups having a molecular cohesive energy equal to or higher than that of the methyl group. Note that Table 1 is cited from "Kagaku Binran Ouyo Hen (Handbook of Chemistry, Applied Chemistry)", edited by The Chemical Society of Japan, 1973.

TABLE 1

| Atomic group | Molecular cohesive energy (kJ/mol) |
|---|---|
| —$CH_2$— | 2.85 |
| —O— | 4.19 |
| —$CH_3$ | 7.12 |
| —NH | 6.28 |
| —CO— | 11.14 |
| —COO— | 12.14 |
| —$C_6H_4$— | 16.33 |
| —$C_6H_5$ | 22.63 |
| —OH | 24.30 |

TABLE 1-continued

| Atomic group | Molecular cohesive energy (kJ/mol) |
|---|---|
| —CONH— | 35.59 |
| —OCONH— | 36.62 |

In the dielectric resin composition for a film capacitor according to the present invention, the cohesion of highly cohesive atomic groups due to the molecular cohesive energy may be formed between molecules of the first organic material, between molecules of the second organic material, or between molecules of the first organic material and the second organic material. Furthermore, the highly cohesive atomic groups that cohere with each other may be the same or different atomic groups.

The dielectric resin composition for a film capacitor according to the present invention will be described on the basis of an embodiment illustrated in FIG. 2.

Figure 2:
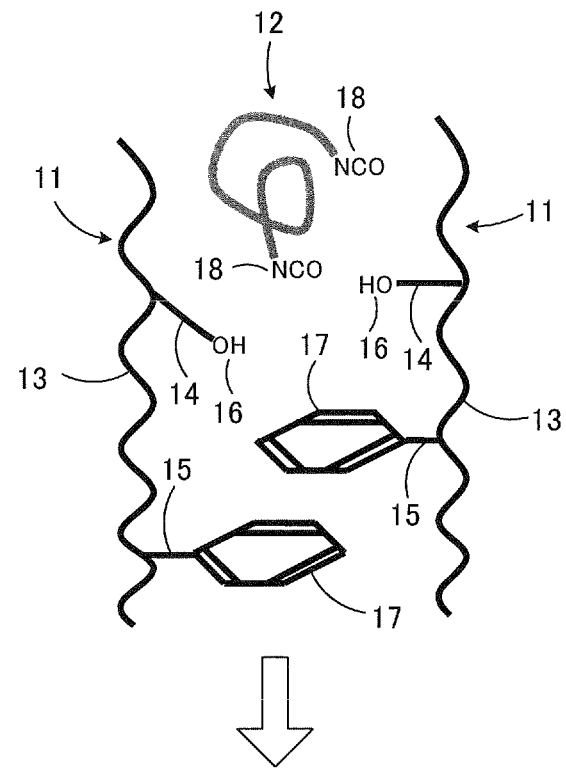
FIG. 2 is a schematic view illustrating the principle of improvement in the heat resistance of a dielectric resin composition according to the present invention, and illustrating the crosslinked state and interaction due to cohesive energy between a first organic material and a second organic material.
Figure 2:
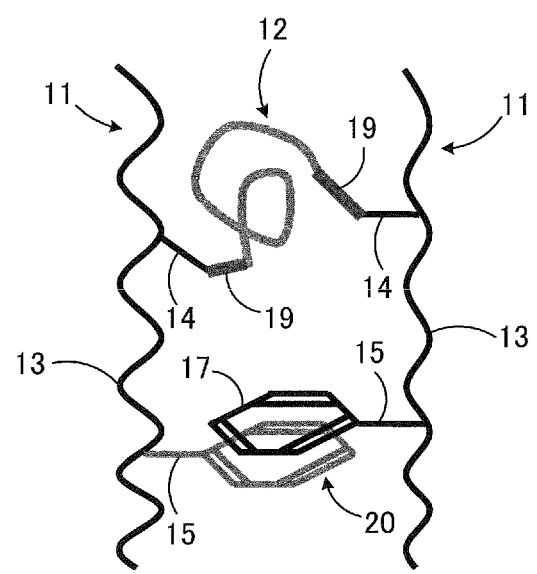

As illustrated at the top of FIG. 2, the dielectric resin composition is a mixture of a polyvinyl acetal 11 serving as the first organic material and a polyisocyanate 12 serving as the second organic material. As schematically illustrated, the polyvinyl acetal 11 includes a main chain 13 and some side chains 14 and 15. The side chain 14 has a hydroxy group 16 serving as a functional group at its end. The side chain 15 has a benzene ring 17 at its end. The benzene ring 17 is an example of a highly cohesive atomic groups having a molecular cohesive energy equal to or higher than that of a methyl group, as described in Table 1.

The polyisocyanate 12 has an isocyanato group 18 at each end of the main chain. The isocyanato group 18 is subjected to a crosslinking reaction with the hydroxy group 16 described above.

Heating the mixture of the polyvinyl acetal 11 and the polyisocyanate 12 allows the hydroxy group 16 to be crosslinked to the isocyanato groups 18 to form crosslinked portions 19 as illustrated at the bottom of FIG. 2. In addition, the benzene rings 17 in the polyvinyl acetal 11 form a cohesive portion 20 by an interaction based on individual molecular cohesive energy, providing a pseudo-crosslinked structure. In this way, the effect of improving the heat resistance owing to the crosslinked portions 19 is augmented by the cohesive portion 20 which serves to improve the heat resistance, thereby improving the overall heat resistance of the dielectric resin film serving as a cured article of the dielectric resin composition.

The dielectric resin film serving as a cured article has a glass transition temperature of 130° C. or higher and a breakdown voltage of 350 V/μm or more, as is apparent from experimental examples described below.

In the foregoing dielectric resin composition, the proportion of the highly cohesive atomic group, such as the benzene ring 17, is preferably in the range of 5 mole percent to 95 mole percent. The cured article preferably has a polyvinyl acetal 11 content of 10% by weight to 90% by weight. The polyvinyl acetal 11 preferably has a hydroxy group 16 content of 10% to 38% by weight.

Experimental examples performed to confirm the effect of the present invention and determine a preferred range of the present invention will be described below.

Experimental Example 1

In Experimental Example 1, comparisons were made at different ratios of acetoacetal groups to benzacetal groups of a polyvinyl acetal.

The method for producing a polyvinyl acetal resin having a benzene ring in its side chain employed included after maintaining an aqueous solution of polyvinyl alcohol at a predetermined temperature, adding benzaldehyde, acetaldehyde, and a catalyst thereto, allowing acetalization to proceed, maintaining the resulting reaction mixture at a predetermined high temperature, and performing neutralization, washing with water, and drying to give a polyvinyl acetal powder (for example, see Japanese Unexamined Patent Application Publication No. 2002-327065 which describes the same reaction without a benzene-containing reactant). The ratio of acetoacetal groups to benzacetal groups in acetal groups in the side chains was adjusted by calculating the ratio of acetoacetal groups to benzacetal groups in a finally synthesized polyvinyl acetal and changing reactant proportions based on that calculation.

Table 2 shows the ratios of acetoacetal groups to benzacetal groups obtained in Experimental Example 1. The polyvinyl acetal used had an acetal group content of 80% by weight, a hydroxy group content of 17% by weight, and an acetyl group content of 3% by weight.

The polyvinyl acetal was dissolved in an ethyl acetate solvent to prepare a solution having a polyvinyl acetal concentration of 7% by weight. The polyvinyl acetal solution was passed through a high-pressure homogenizer and treated eight times at 150 MPa. Then, the polyvinyl acetal solution was passed five times through a filter having a pore size of 0.45 μm to remove foreign matter.

An MEK oxime-blocked tolylene diisocyanate (TDI) TMP adduct solution was added to the polyvinyl acetal solution obtained after the removal of foreign matter as described above. The resulting mixed solution was stirred for homogenization. The solid concentration was adjusted in such a manner that the proportion of the polyvinyl acetal was 50% by weight in a cured article to be formed.

The mixed solution was passed three times through a filter having a pore size of 0.45 μm to remove foreign matter, and then was formed into a film. The resulting film was placed in a hot-air oven and subjected to curing at 180° C. for 1 hour to provide a sample film serving as a cured article. The glass transition temperature (Tg), the breakdown voltage, the handleability, the dielectric constant, and the dielectric loss of the resulting film were evaluated and the results described in Table 2.

Specifically, the glass transition temperature (Tg) was measured with a differential thermal analyzer.

The dielectric constant and the dielectric loss were determined using an evaluation sample provided with electrodes formed by evaporation on surfaces of the film.

With respect to the breakdown voltage, the same evaluation sample as above was used. A method for applying an electric field to the film was employed, the method including the field strength being increased in steps of 25 V/μm and holding the sample at field strengths for 10 minutes for each field strength. The field strength at which the electrostatic capacity was reduced by the breakage of the film to 0% of an initial value was defined as a breakdown voltage. In this measurement, 10 specimens for each sample were used. A value when the failure rate based on the Weibull distribution was 50% was used as a mean value of the breakdown voltage. Note that the breakdown voltage was measured at 25° C. and 150° C.

The handleability was evaluated using a bending test. That is, the handleability was evaluated on the basis of whether breakage occurred in bending a strip film in such a manner that both end faces were brought into contact with each other. As the strip film, a film having dimensions of 50 mm×10 mm×5 μm thick was used. Ten specimens for each sample were used. The number of broken specimens was counted. In Table 2, the symbol "⊙" represents a sample in which the number of broken specimens was zero. The symbol "○" represents a sample in which the number of broken specimens was 1 to 2. The symbol "Δ" represents a sample in which the number of broken specimens was 2 to 4. Note that in the case where the number of broken specimens was 4 to 10, such a sample was intended to be represented by "x". However, no sample was evaluated to be "x".

TABLE 2

| Sample | Acetal group | | Tg [° C.] | Breakdown voltage at 25° C. [V/μm] | Breakdown voltage at 150° C. [V/μm] | Handleability | Dielectric constant at 1 kHz | Dielectric loss at 1 kHz |
|---|---|---|---|---|---|---|---|---|
| | Acetoacetal group [mol %] | Benzacetal group [mol %] | | | | | | |
| 1 | 100 | 0 | 140 | 350 | 300 | ⊙ | 3.5 | 0.80 |
| 2 | 95 | 5 | 155 | 380 | 380 | ⊙ | 3.6 | 0.82 |
| 3 | 50 | 50 | 160 | 425 | 425 | ⊙ | 3.7 | 0.80 |
| 4 | 40 | 60 | 165 | 475 | 475 | ⊙ | 3.6 | 0.85 |
| 5 | 30 | 70 | 165 | 475 | 475 | ⊙ | 3.7 | 0.85 |
| 6 | 5 | 95 | 165 | 475 | 475 | ○ | 3.6 | 0.80 |
| 7 | 0 | 100 | 165 | 475 | 475 | Δ | 3.6 | 0.84 |

In Table 2, sample 1 is a comparative example in which the sample does not contain a group having a molecular cohesive energy equal to or higher than that of a methyl group. Sample 1 has the lowest glass transition temperature and the lowest breakdown voltage among samples 1 to 7.

In contrast, each of samples 2 to 7 has an improved breakdown voltage. Furthermore the breakdown voltage at 150° C. is comparable to that at 25° C. as a result of an increase in glass transition temperature. This is presumably because of the effect of the pseudo-crosslinking caused by an interaction between benzacetal groups having high molecular cohesive energy, in addition to the effect of the crosslinking. For benzacetal groups, it is speculated that an effect due to an interaction between π-electrons of the benzene rings is provided.

A higher benzacetal group content leads to a reduction in handleability, as in sample 7. Overall, the proportion of the benzacetal group, which is a highly cohesive atomic group, is preferably in the range of 5 to 95 mole percent, as in samples 2 to 6. Furthermore, in the case where the glass transition temperature and the breakdown voltage are taken into account, as in samples 3 to 5, the benzacetal group content is more preferably in the range of 30% to 50% by weight.

Experimental Example 2

In Experimental Example 2, comparisons were made between an acetal group and a carbonyl group serving as atomic groups each attached to a side chain of the acetal group.

In Table 3, the atomic group in the side chain of the acetal group is a benzacetal group in sample 11. This is the same as in sample 4 in Experimental Example 1. In Table 3, sample 12 is the same as sample 11, except that the benzacetal group is replaced with a carbonyl group.

TABLE 3

| Sample | Molecular group in side chain of acetal group | Tg [° C.] | Breakdown voltage at 25° C. [V/μm] | Breakdown voltage at 150° C. [V/μm] | Handleability | Dielectric constant at 1 kHz | Dielectric loss at 1 kHz |
|---|---|---|---|---|---|---|---|
| 11 | Benzacetal group | 165 | 475 | 475 | ⊙ | 3.6 | 0.85 |
| 12 | Carbonyl group | 155 | 450 | 450 | ⊙ | 3.6 | 0.85 |

Table 3 demonstrates that sample 12 with the carbonyl group has a glass transition temperature, a breakdown voltage, and handleability comparable to those in sample 11 with the benzacetal group.

Experimental Example 3

In Experimental Example 3, comparisons were made at different polyvinyl acetal contents in the cured article. That is, as shown in Table 4, the polyvinyl acetal content was changed in the range of 10% to 100% by weight. Other conditions were the same as those in sample 4 in Experimental Example 1. Thus, sample 24 in Experimental Example 3 is the same as sample 4 in Experimental Example 1.

TABLE 4

| Sample | Polyvinyl acetal [% by weight] | Tg [° C.] | Breakdown voltage at 25° C. [V/μm] | Breakdown voltage at 150° C. [V/μm] | Handleability | Dielectric constant at 1 kHz | Dielectric loss at 1 kHz |
|---|---|---|---|---|---|---|---|
| 21 | 100 | 105 | 225 | 230 | ⊙ | 2.8 | 0.82 |
| 22 | 90 | 145 | 400 | 360 | ⊙ | 3.2 | 0.82 |
| 23 | 60 | 160 | 430 | 420 | ⊙ | 3.4 | 0.83 |
| 24 | 50 | 165 | 475 | 475 | ⊙ | 3.6 | 0.85 |
| 25 | 40 | 165 | 475 | 475 | ⊙ | 3.6 | 0.84 |
| 26 | 20 | 163 | 450 | 450 | ○ | 3.7 | 0.84 |
| 27 | 10 | 160 | 425 | 425 | Δ | 3.7 | 0.84 |

As is clear from Table 4, excellent results are obtained in samples 22 to 27 each having a polyvinyl acetal content of 10% to 90% by weight. Sample 21 having a polyvinyl acetal content of 100% by weight has a reduced glass transition temperature and a reduced breakdown voltage. Thus, the polyvinyl acetal content of a cured article is preferably in the range of 10% to 90% by weight.

Experimental Example 4

In Experimental Example 4, comparisons were made at different hydroxy group contents of the polyvinyl acetal. That is, as shown in Table 5, the hydroxy group content was changed in the range of 10% to 40% by weight. Other conditions were the same as those in sample 4 in Experimental Example 1.

TABLE 5

| Sample | Hydroxy group [% by weight] | Tg [° C.] | Breakdown voltage at 25° C. [V/μm] | Breakdown voltage at 150° C. [V/μm] | Handleability | Dielectric constant at 1 kHz | Dielectric loss at 1 kHz | Remarks |
|---|---|---|---|---|---|---|---|---|
| 31 | 40 | — | — | — | — | — | — | The resin is not dissolved in the organic solvent, failing to form a film. |
| 32 | 38 | 155 | 425 | 425 | ⊙ | 3.5 | 0.85 | |
| 33 | 30 | 163 | 450 | 450 | ⊙ | 3.6 | 0.86 | |
| 34 | 17 | 165 | 475 | 475 | ⊙ | 3.6 | 0.85 | |
| 35 | 15 | 160 | 475 | 475 | ⊙ | 3.5 | 0.83 | |
| 36 | 10 | 163 | 450 | 450 | ⊙ | 3.5 | 0.83 | |

As is clear from Table 5, the polyvinyl acetal was not dissolved in an organic solvent, such as a ethyl acetate solvent, thus failing to form a film with sample 31 having a hydroxy group content of 40% by weight.

In contrast, it was possible to form a film with samples 32 to 36 each having a hydroxy group content of 10% to 38% by weight. Furthermore, excellent results were obtained in terms of the glass transition temperature, breakdown voltage, and handleability. This demonstrates that the polyvinyl acetal preferably has a hydroxy group content of 10% to 38% by weight.

REFERENCE SIGNS LIST 1 film capacitor
3, 4 dielectric resin film
5, 6 counter electrode
11 polyvinyl acetal (first organic material)
12 polyisocyanate (second organic material)
13 main chain
14, 15 side chain
16 hydroxy group (functional group)
17 benzene ring (highly cohesive atomic group)
18 isocyanato group (functional group)
19 crosslinked portion
20 cohesive portion

The invention claimed is:

1. A dielectric resin composition for a film capacitor comprising a mixture of:
   two first organic materials, each of the two first organic materials having (1) a respective first functional group and (2) a respective cohesive atomic group that has a molecular cohesive energy equal to or higher than that of a methyl group, and each respective cohesive atomic group is located at an end of a main chain or a side chain of its respective first organic material; and
   a second organic material, the second organic material having a pair of second functional groups,
   wherein, the two first organic materials and the second organic material have characteristics that, when the dielectric resin composition is cured, each of the respective first functional groups react with a respective second functional group of the pair of second functional groups to form a crosslink and the two first organic materials are also joined to each other by cohesive attraction between the respective cohesive atomic groups to produce a cured article that is dielectric, has a glass transition temperature of 130° C. or higher, and has a breakdown voltage of 350 V/μm or more at 150° C.

2. The dielectric resin composition for a film capacitor according to claim 1, wherein the two first organic materials are a polyvinyl acetal having the cohesive atomic group located at an end of the side chain of an acetal group in the polyvinyl acetal, and a proportion of the cohesive atomic group in the acetal group is in a range of 5 mole percent to 95 mole percent.

3. The dielectric resin composition for a film capacitor according to claim 2, wherein the two first organic materials and the second organic material have characteristics that, when the dielectric resin composition is cured, the produced cured article has a polyvinyl acetal content of 10% by weight to 90% by weight.

4. The dielectric resin composition for a film capacitor according to claim 3, wherein the polyvinyl acetal has a hydroxy group content of 10% to 38% by weight.

5. The dielectric resin composition for a film capacitor according to claim 4, wherein the cohesive atomic group is a benzene group and the polyvinyl acetal has a benzacetal content of 30 to 50% by weight.

6. A film capacitor comprising:
a dielectric resin film comprising the dielectric resin composition for a film capacitor according to claim 5; and
first and second counter electrodes facing each other with the dielectric resin film therebetween.

7. A film capacitor comprising:
a dielectric resin film comprising the dielectric resin composition for a film capacitor according to claim 2; and
first and second counter electrodes facing each other with the dielectric resin film therebetween.

8. A film capacitor comprising:
a dielectric resin film comprising the dielectric resin composition for a film capacitor according to claim 3; and
first and second counter electrodes facing each other with the dielectric resin film therebetween.

9. A film capacitor comprising:
a dielectric resin film comprising the dielectric resin composition for a film capacitor according to claim 4; and
first and second counter electrodes facing each other with the dielectric resin film therebetween.

10. The dielectric resin composition for a film capacitor according to claim 1, wherein, the two first organic materials and the second organic material have characteristics that, when the dielectric resin composition is cured, a proportion of the cohesive atomic group in the produced cured article is in a range of 5 mole percent to 95 mole percent.

11. A film capacitor comprising:
a dielectric resin film comprising the dielectric resin composition for a film capacitor according to claim 10; and
first and second counter electrodes facing each other with the dielectric resin film therebetween.

12. The dielectric resin composition for a film capacitor according to claim 1, wherein, the two first organic materials and the second organic material have characteristics that, when the dielectric resin composition is cured, the produced cured article has a polyvinyl acetal content of 10% by weight to 90% by weight.

13. The dielectric resin composition for a film capacitor according to claim 12, wherein the polyvinyl acetal has a hydroxy group content of 10% to 38% by weight.

14. A film capacitor comprising:
a dielectric resin film comprising the dielectric resin composition for a film capacitor according to claim 13; and
first and second counter electrodes facing each other with the dielectric resin film therebetween.

15. A film capacitor comprising:
a dielectric resin film comprising the dielectric resin composition for a film capacitor according to claim 12; and
first and second counter electrodes facing each other with the dielectric resin film therebetween.

16. The dielectric resin composition for a film capacitor according to claim 1, wherein the second organic material is a polyisocyanate.

17. A film capacitor comprising:
a dielectric resin film comprising the dielectric resin composition for a film capacitor according to claim 16; and
first and second counter electrodes facing each other with the dielectric resin film therebetween.

18. The dielectric resin composition for a film capacitor according to claim 1, wherein the cohesive atomic group is selected from the group consisting of —NH, —CO—, —COO—, —$C_6H_4$—, —$C_6H_5$, —OH, —CONH—, and —OCONH—, and, the two first organic materials and the second organic material have characteristics that, when the dielectric resin composition is cured, the produced cured article has a cohesive atomic group content of 30 to 50% by weight.

19. A film capacitor comprising:
a dielectric resin film comprising the dielectric resin composition for a film capacitor according to claim 1; and
first and second counter electrodes facing each other with the dielectric resin film therebetween.

* * * * *